United States Patent
Zhang et al.

(10) Patent No.: US 12,457,072 B2
(45) Date of Patent: Oct. 28, 2025

(54) QUASI-CO-LOCATED ASSUMPTION FOR APERIODIC CSI-RS FOR MULTI-TRP OPERATION

(71) Applicant: Apple Inc., Cupertino, CA (US)

(72) Inventors: Yushu Zhang, Beijing (CN); Haitong Sun, Cupertino, CA (US); Weidong Yang, San Diego, CA (US); Wei Zeng, San Diego, CA (US); Haijing Hu, Beijing (CN); Dawei Zhang, Saratoga, CA (US); Yuchul Kim, Santa Clara, CA (US); Hong He, Cupertino, CA (US); Oghenekome Oteri, San Diego, CA (US); Chunhai Yao, Beijing (CN); Chunxuan Ye, San Diego, CA (US); Fangli Xu, Beijing (CN); Yuqin Chen, Shenzhen (CN); Zhibin Wu, Los Altos, CA (US); Shu Guo, Beijing (CN)

(73) Assignee: Apple Inc., Cupertino, CA (US)

( * ) Notice: Subject to any disclaimer, the term of this patent is extended or adjusted under 35 U.S.C. 154(b) by 443 days.

(21) Appl. No.: 17/912,446

(22) PCT Filed: Apr. 8, 2020

(86) PCT No.: PCT/CN2020/083673
§ 371 (c)(1),
(2) Date: Sep. 16, 2022

(87) PCT Pub. No.: WO2021/203272
PCT Pub. Date: Oct. 14, 2021

(65) Prior Publication Data
US 2023/0155773 A1    May 18, 2023

(51) Int. Cl.
*H04L 5/00* (2006.01)
*H04W 72/232* (2023.01)

(52) U.S. Cl.
CPC .......... *H04L 5/0051* (2013.01); *H04L 5/0035* (2013.01); *H04L 5/0053* (2013.01); *H04W 72/232* (2023.01)

(58) Field of Classification Search
CPC ... H04L 5/0051; H04L 5/0035; H04L 5/0053; H04W 72/232; H04B 7/0665; H04B 7/088
(Continued)

(56) References Cited

U.S. PATENT DOCUMENTS

2019/0229792 A1 * 7/2019 John Wilson ......... H04L 5/0051
2020/0077395 A1    3/2020 Guo
(Continued)

FOREIGN PATENT DOCUMENTS

CN         108092754          5/2018

OTHER PUBLICATIONS

International Search Report and Written Opinion of PCT Patent Application No. PCT/CN2020/083673; 9 pages; Dec. 30, 2020.
(Continued)

*Primary Examiner* — Ricardo H Castaneyra
(74) *Attorney, Agent, or Firm* — Kowert, Hood, Munyon, Rankin & Goetzel, P.C.

(57) ABSTRACT

This disclosure relates to techniques for determining a quasi-co-located assumption for aperiodic channel state information reference signals for multi-transmission-reception-point operation in a wireless communication system. A wireless device may establish wireless links with multiple transmission-reception-points of a cellular network. The wireless device may receive downlink control information. The wireless device may determine a quasi-co-located assumption for aperiodic channel state information reference signals for the downlink control information. Signals received according to the quasi-co-located assumption for
(Continued)

aperiodic channel state information reference signals may be buffered by the wireless device if a scheduling offset for the downlink control information is below a scheduling offset threshold.

13 Claims, 9 Drawing Sheets

(58) Field of Classification Search
USPC .......................................................... 370/329
See application file for complete search history.

(56) References Cited

U.S. PATENT DOCUMENTS

| 2021/0067205 | A1* | 3/2021 | Manolakos | ........... | H04L 5/0053 |
| 2021/0258964 | A1* | 8/2021 | Khoshnevisan | ....... | H04B 7/022 |
| 2023/0171062 | A1* | 6/2023 | Khoshnevisan | ...... | H04L 5/0085 |
| | | | | | 370/329 |

OTHER PUBLICATIONS

Interdigital, Inc. "Remaining issues on beam management"; 3GPP TSG RAN WG1 Meeting #93 R1-1807014; Busan, Korea; 6 pages; May 21, 2018.
Ericsson "Summary of draft CRs for beam management and QCL"; 3GPP TSG-RAN WG1 Meeting #96 R1-1903382; Athens, 23 pages; Feb. 25, 2019.
ZTE "Leftover issues on aperiodic Csi-Rs" 3GPP TSG RAN WG1 Meeting #96bis R1-1904029; Xi'an, China; 4 pages; Apr. 8, 2019.

* cited by examiner

QUASI-CO-LOCATED ASSUMPTION FOR APERIODIC CSI-RS FOR MULTI-TRP OPERATION

PRIORITY CLAIM

This application is a national phase entry of PCT application number PCT/CN2020/083673, entitled "Quasi-Co-Located Assumption for Aperiodic CSI-RS for Multi-TRP Operation," filed Apr. 8, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for determining a quasi-co-located assumption for aperiodic channel state information reference signals for multi-transmission-reception-point operation in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for determining a quasi-co-located assumption for aperiodic channel state information reference signals for multi-transmission-reception-point operation in a wireless communication system.

The techniques described herein may support a wireless device in determining which quasi-co-located assumption to use to buffer received signals, e.g., in case those received signals include aperiodic channel state information reference signals, when the scheduling offset is below a certain threshold. The techniques may include approaches to determining the quasi-co-located assumption for aperiodic channel state information reference signals for each of single downlink control information mode (e.g., when a single downlink control information transmission is provided to schedule communications for multiple transmission-reception-points) and for multi downlink control information mode (e.g., when each transmission-reception-point can provide downlink control information scheduling communications for itself).

The techniques may include one or more primary approaches to determining the quasi-co-located assumption for aperiodic channel state information reference signals (e.g., for each of single downlink control information mode and for multi downlink control information mode), as well as one or more backup/default approaches, e.g., in case conditions for the primary approach are not met and/or in case a wireless device does not support an approach to determining the quasi-co-located assumption for aperiodic channel state information reference signals, according to various embodiments. Further, it may be the case that different approaches can be taken (e.g., configured by a base station, or specified by a cellular communication standard) for different types of channel state information reference signals, at least in some instances.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
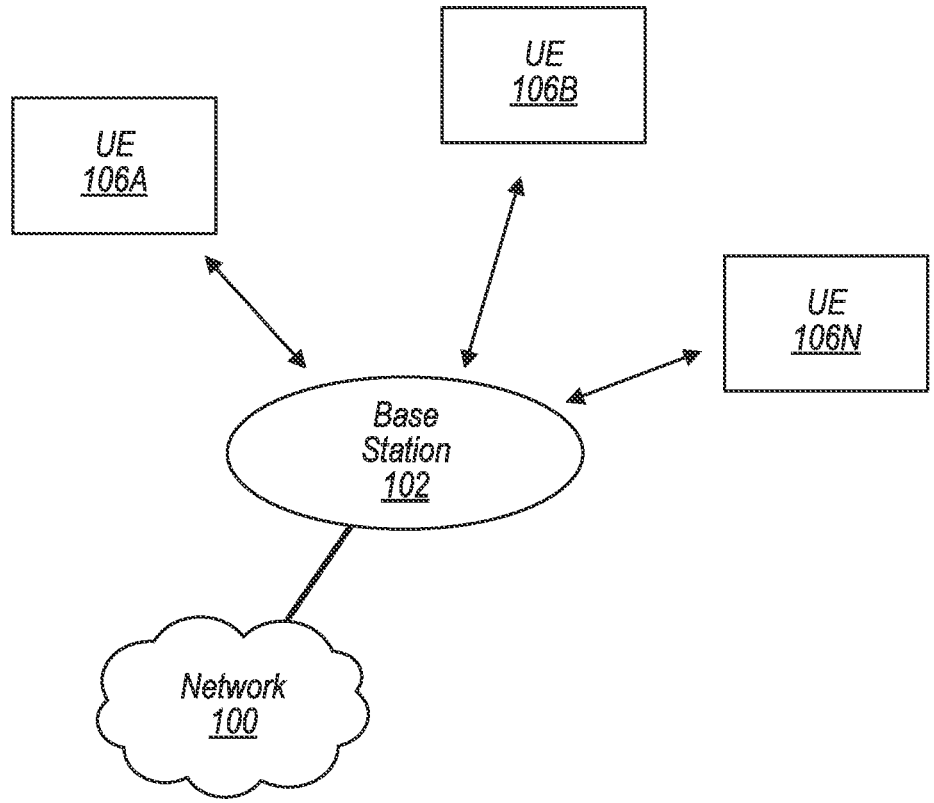
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location
CSI: Channel State Information
CSI-RS: Channel State Information Reference Signals
CQI: Channel Quality Indicator
PMI: Precoding Matrix Indicator
RI: Rank Indicator Terms The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
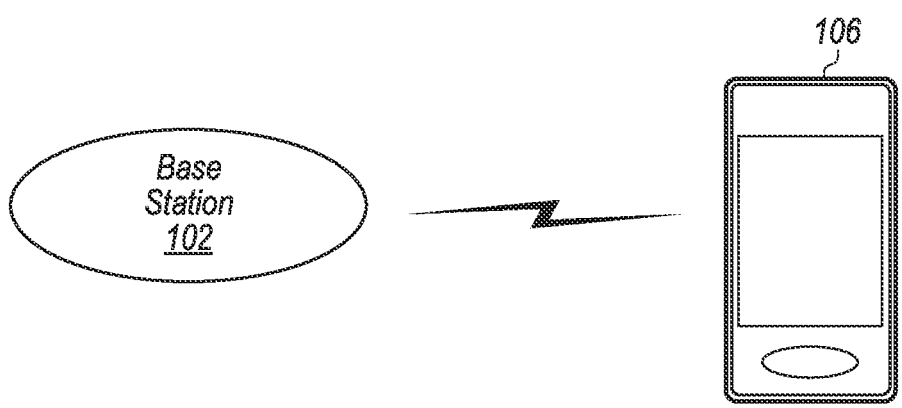
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for determining a quasi-co-located assumption for aperiodic channel state information reference signals for multi-transmission-reception-point operation in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
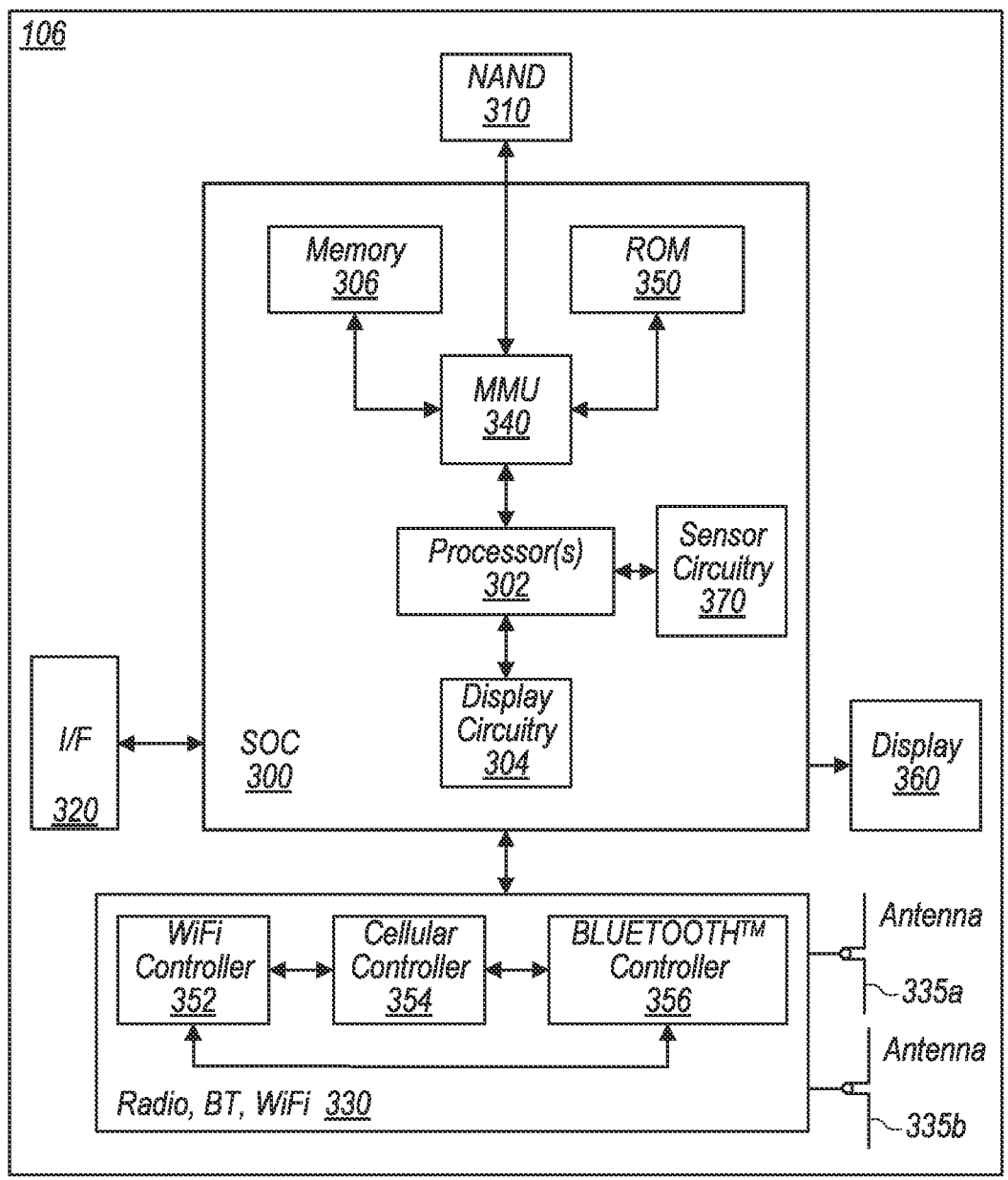
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform techniques for determining a quasi-co-located assumption for aperiodic channel state information reference signals for multi-transmission-reception-point operation in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for determining a quasi-co-located assumption for aperiodic channel state information reference signals for multi-transmission-reception-point operation in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
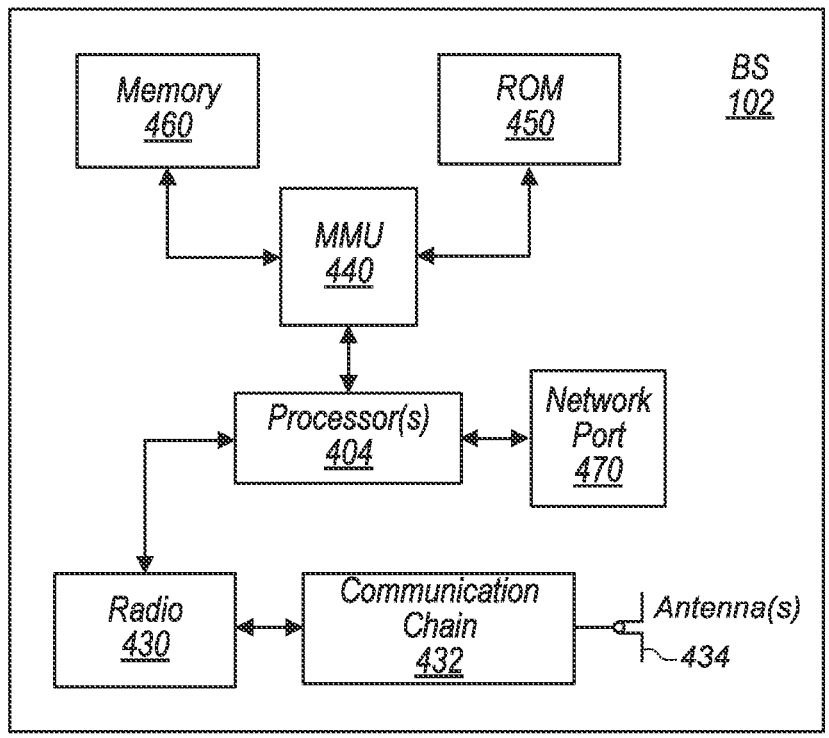
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Channel State Information

A wireless device, such as a user equipment, may be configured to measure the quality of the downlink channel and report information related to this quality measurement to the base station. For example, the UE may periodically send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In most cellular systems, the base station transmits a pilot signal (or a reference signal), such as channel state information reference signals (CSI-RS), where this reference signal is used for estimating a channel (or a portion of a channel) between the base station and a UE. The UE receives this reference signal and based on this reference signal calculates channel state information (CSI). The UE then reports this channel state information back to the base station. The base station may then generate downlink data based on the received CSI and transmit this downlink data to the UE. Stated another way, the base station may adjust the manner in which downlink data is coded and generated based on the received channel state information from the UE.

As an example, in the 3GPP NR cellular communication standard, the channel state information fed back from the UE may include one or more of a channel quality indicator (CQI), a precoding matrix indicator (PMI), a rank indicator (RI), a CSI-RS Resource Indicator ((SRI), a SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear precoding. The base station and the UE may share a codebook composed of multiple precoding, matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
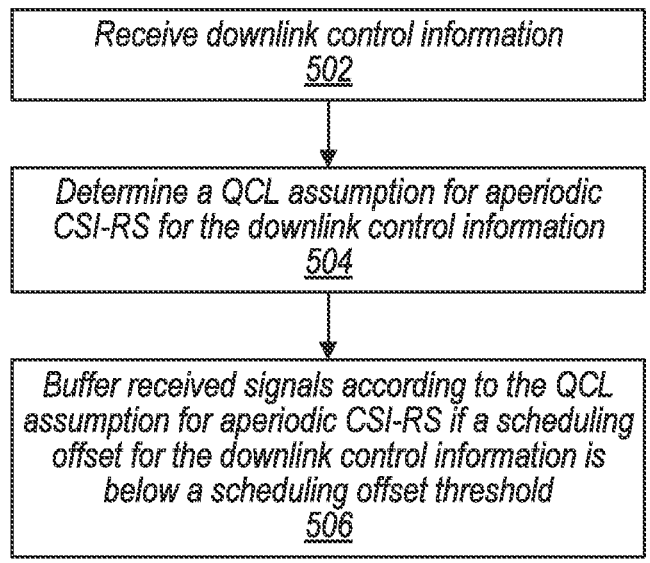
FIG. 5 is a flowchart diagram illustrating aspects of an exemplary possible method for determining a quasi-colocated assumption for aperiodic channel state information reference signals for multi-transmission-reception-point operation in a wireless communication system, according to some embodiments.

FIG. 5—QCL Assumption for Aperiodic CSI-RS for Multi-TRP Operation

According to some cellular communication technologies, it may be possible for a wireless device to communicate with multiple transmission-reception-points (TRPs), including potentially simultaneously. Such communication can be scheduled using downlink control information (DCI), which may be provided using control signaling such as on a physical downlink control channel (PDCCH) that may be transmitted in one or more control resource sets (CORESETs). The DCI can be provided in a single DCI mode, in which communications between multiple TRPs and a wireless device can be scheduled using a single DCI communication (e.g., from just one TRP), or in a multi-DCI mode, in which each of multiple TRPs can provide DCI communications scheduling their own communications with a wireless device.

The communications that are scheduled in such a multi-TRP scenario can include data communications (e.g., which may be transmitted using a physical downlink shared channel (PDSCH), and/or aperiodic channel state information reference signal (CSI-RS) transmissions, among various possibilities. Further, aperiodic CSI-RS transmissions can include CSI-RS that are configured for multiple possible purposes, such as for beam management, tracking, or CSI acquisition. The amount of time (e.g., in any of various absolute or cellular communication system specific units, such as milliseconds, slots, symbols, etc.) between transmission of DCI and a communication scheduled by the DCI may be referred to as a scheduling offset, at least according to some embodiments.

When a wireless device receives DCI scheduling a (e.g., PDSCH or aperiodic CSI-RS) communication, the wireless device may require a certain amount of time to decode the DCI and determine for when the communication is scheduled. This amount of time may be referred to as a scheduling offset threshold, and may be reported by the wireless device in capability information, at least in some embodiments. If the DCI schedules a communication with a scheduling offset that is greater than the scheduling offset threshold, the wireless device may be able to fully decode and determine the resources scheduled for the communication, e.g., potentially including a beam configuration to be used for the communication. For example, the DCI may include a quasi-co-location indication, such as a transmission configuration indicator (TCI), from which the wireless device may be able to select an antenna/beam configuration to receive the signals scheduled by the DCI, at least in some embodiments. However, if the DCI schedules a communication with a scheduling offset that is below the scheduling offset threshold, the wireless device may be unable to determine which TCI the communication uses from the DCI before the communication occurs. In some instances, it may be possible to require that the scheduling offset (e.g., at least for certain types of communications) always be greater than the scheduling offset threshold for a wireless device, however, at least in some instances, this may limit the network scheduling flexibility.

Accordingly, at least in some embodiments, a quasi-co-located assumption may be used by a wireless device to buffer signals received in case the scheduling offset for a DCI transmission is below the scheduling offset threshold for the wireless device. The quasi-co-located assumption may include an assumption regarding the antenna and beam configuration (e.g., TCI state) to be used if a DCI schedules a communication with a scheduling offset that is below the scheduling offset threshold for the wireless device. In other words, wireless device may make a quasi-co-located assumption in order to determine a spatial filter (e.g., which antenna ports/beam configuration) to apply or order to receive and buffer signals that may contain a scheduled communication in the absence of (e.g., prior to it being possible to decode) an explicit quasi-co-location indication. In such a case, if a DCI transmission does schedule a communication that is included in the buffered signals, the wireless device may be able to decode the transmission from the buffered signals after decoding the DCI. If the technique used by the wireless device to determine the quasi-co-located assumption is known by both the wireless device and the network, such a mechanism may allow for a cellular network to schedule communications with a scheduling offset that is below the scheduling offset threshold for a wireless device and expect the wireless device to reliably be able to receive and decode the scheduled communications, e.g., if those communications are scheduled in accordance with the quasi-co-located assumption that will be made by the wireless device, at least according to some embodiments.

Thus, it may be beneficial to specify techniques for a wireless device to determine quasi-co-located assumptions in various scenarios. To illustrate one such set of possible techniques, FIG. 5 is a flowchart diagram illustrating a method for determining a quasi-co-located assumption for aperiodic channel state information reference signals for multi-transmission-reception-point operation in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities. As one such possibility, the capability information may indicate one or more aperiodic CSI-RS QCL assumption determination approaches supported by the wireless device. For example, some or all of the framework for determining a QCL assumption for aperiodic CSI-RS described herein with respect to FIG. 5, or another framework for determining a QCL assumption for aperiodic CSI-RS, may be defined as a feature for which a wireless device can indicate support or lack of support.

In 502, the wireless device may receive downlink control information. The downlink control information may be received in a single DCI mode or a multi-DCI mode, according to various embodiments. The DCI may be provided using a scheduling PDCCH communication via one or more CORESETs that the wireless device is configured to monitor. In some instances, in single DCI mode, the DCI may be provided using a scheduling PDCCH communication via a single CORESET, while in multi-DCI mode, it may be possible that the DCI is provided using one (or more) of multiple CORESETs (e.g., that may be received using different TCIs) that the wireless device is configured to monitor.

In 504, the wireless device may determine a QCL assumption for aperiodic CSI-RS for the downlink control information. The manner in which the QCL assumption is determined may be based at least in part on whether the DCI is received in single DCI mode or multi-DCI mode, and/or based at least in part on a type of CSI-RS for which the QCL assumption is determined (e.g., CSI-RS for beam management; CSI-RS for tracking; or CSI-RS for CSI acquisition).

For example, as one possibility, if the DCI is received in a single DCI mode, determining the QCL assumption for aperiodic CSI-RS for the downlink control information may include selecting the TCIs corresponding to a lowest TCI codepoint among activated TCI codepoints that include two different TCI states. In such a scenario, if there is no TCI codepoint that includes more than 1 TCI state (or possibly if the wireless device indicated in capability information that it does not support such an approach to determining a QCL assumption for aperiodic CSI-RS), the QCL assumption may be based on a QCL assumption for a monitored control resource set in a latest slot with a lowest identifier.

As another possibility, if the DCI is received in a single DCI mode, determining the QCL assumption for aperiodic CSI-RS for the downlink control information may include selecting one TCI (e.g., of the two TCIs) that is included in a lowest TCI codepoint among activated TCI codepoints that include two different TCI states. Which of the two TCIs is selected may be determined in any of various ways, and may be pre-configured or may be configured by the cellular network (e.g., using configuration information received from a serving base station). As one possibility, selection of which of the two TCIs may be based on an order of the two different TCI states included in the lowest TCI codepoint among activated TCI codepoints that include two different TCI states (e.g., the first TCI may be selected, or the second TCI may be selected). As another possibility, selection of which of the two TCIs may be based on their TCI state identifiers (e.g., the TCI with the lower TCI state ID may be selected, or the TCI with the higher TCI state ID may be selected). As still a further possibility, selection of which of the two TCIs may be based on a CSI-RS resource index or CSI-RS resource set index of the aperiodic CSI-RS (e.g., the TCI state with TCI index=CSI-RS resource set index mod 2 could be selected, or any of various other formulas relating CSI-RS resource index or CSI-RS resource set index to TCI index could be used to select the TCI). In such a scenario, if there is no TCI codepoint that includes more than 1 TCI state (or possibly if the wireless device indicated in capability information that it does not support such an approach to determining a QCL assumption for aperiodic CSI-RS), the QCL assumption may be based on a QCL assumption for a monitored control resource set in a latest slot with a lowest identifier.

In some instances, if the DCI is received in a single DCI mode, but there is no TCI state activated by MAC CE, the wireless device may determine the QCL assumption for the aperiodic CSI-RS based on a QCL assumption for a CORESET in a latest slot with a lowest identifier, or if there are no CORESETs configured, the wireless device may determine the QCL assumption for the aperiodic CSI-RS based on a TCI state activated by RRC signaling with a lowest identifier. Alternatively, if the DCI is received in a single DCI mode, but there is no TCI state activated by MAC CE, the wireless device may determine the QCL assumption for the aperiodic CSI-RS based on a synchronization signal block (SSB) identified during initial access or a most recent random access procedure.

As a further possibility, if the DCI is received in a multi DCI mode, determining the QCL assumption for aperiodic CSI-RS may include, for each respective CORESET pool (e.g., of multiple CORESET pools): determining the QCL assumption for aperiodic CSI-RS based on a QCL assumption for a CORESET in a latest slot with a lowest identifier among CORESETs in the respective CORESET pool. In such a scenario, if the wireless device indicated in capability information that it does not support such an approach to determining a QCL assumption for aperiodic CSI-RS, it may be the case that the default QCL assumption is based on a QCL assumption for a monitored CORESET in a latest slot with a lowest identifier.

As a still further possibility, if the DCI is received in a multi DCI mode, determining the QCL assumption for aperiodic CSI-RS for a respective CORESET may be based on a QCL assumption for a CORESET in a latest slot with a lowest identifier among CORESETs in a same CORESET pool as the respective CORESET. In such a scenario, if the wireless device indicated in capability information that it does not support such an approach to determining a QCL assumption for aperiodic CSI-RS, it may be the case that the default QCL assumption is based on a QCL assumption for a monitored CORESET in a latest slot with a lowest identifier.

In some instances, if there is no CORESET configured while in multi-DCI mode, determining the QCL assumption for aperiodic CSI-RS may include selecting a TCI state activated by MAC CE with a lowest identifier. If there is no TCI state activated by MAC CE, the QCL assumption may be determined based on a SSB in a same component carrier or in a component carrier with a lowest identifier in a same band or band group.

In 506, the wireless device may buffer received signals according to the determined QCL assuption for aperiodic CSI-RS if a scheduling offset for the downlink control information is below a scheduling offset threshold. Thus, if the DCI indicates that aperiodic CSI are scheduled using the determined QCL assumption with a scheduling offset that is below the scheduling offset threshold, the wireless device may be able to extract the aperiodic CSI scheduled by the DCI from the buffered signals, at least according to some embodiments.

Note that it could be agreed that, at least in some instances, the scheduling offset for aperiodic CSI-RS will be no less than the scheduling offset threshold reported by the wireless device. In such a scenario, the wireless device may not determine the QCL assumption for aperiodic CSI-RS for the DCI, or buffer received signals for aperiodic CSI-RS. Such an agreement may be in effect at all times, or may be configured at certain times and/or for certain scenarios. For example, such an agreement could apply either or both of single-DCI mode or multi-DCI mode, and/or to any or all of CSI-RS for beam management, CSI-RS for tracking, or CSI-RS for CSI acquisition. Note also that even in such a scenario, it may be the case that the wireless device still determines a QCL assumption for PDSCH for the DCI, and buffers received signals for the PDSCH according to the determined QCL assumption for PDSCH, at least according to some embodiments.

Thus, at least according to some embodiments, the method of FIG. 5 may be used to provide a consistent framework according to which a wireless device can determine a QCL assumption for aperiodic CSI-RS, and thus according to which a cellular network may be able to schedule aperiodic CSI-RS with a scheduling offset below the scheduling offset threshold of a wirleess device. Such a framework may accordingly help improve cellular network scheduling flexibility and improve overall network efficiency, at least in some instances.

FIGS. 6-11 and Additional Information

FIGS. 6-11 illustrate further aspects that might be used in conjunction with the method of FIG. 5 if desired. It should be noted, however, that the exemplary details illustrated in and described with respect to FIGS. 6-11 are not intended to be limiting to the disclosure as a whole: numerous variations and alternatives to the details provided herein below are possible and should be considered within the scope of the disclosure.

For multi-TRP operation, the PDSCH can be transmitted from multiple TRPs based on different transmission configuration indicators (TCIs). A TCI may be used to indicate the Quasi-Co-Location (QCL) assumption for PDSCH reception, e.g., as defined in 3GPP TS 38.214 v.15.8.0 section 5.1.5, at least according to some embodiments. It may be the case that PDSCHs can be scheduled by a single downlink control information (DCI) transmission or by multiple DCI transmissions, e.g., in a single-DCI mode or in a multi-DCI mode.

If the scheduling offset for the PDSCH is below a certain threshold, it may be the case that the UE does not have enough time to decode the scheduling PDCCH for a potential PDSCH transmission. In this case, the UE may apply a default QCL, e.g., to buffer received signals in case a PDSCH transmission is indeed scheduled.

As one possibility, it may be agreed that the default QCL assumption for single-DCI mode may be based on the two TCI states corresponding to the lowest TCI codepoint among the TCI codepoints containing two different TCI states that are activated. It may also be agreed that the default QCL assumption for multi-DCI mode may be based on the QCL assumption for the monitored control resource set (CORESET) in the latest slot with the lowest ID among the CORESETs with the same CORESET-poolIndex.

Figure 6:
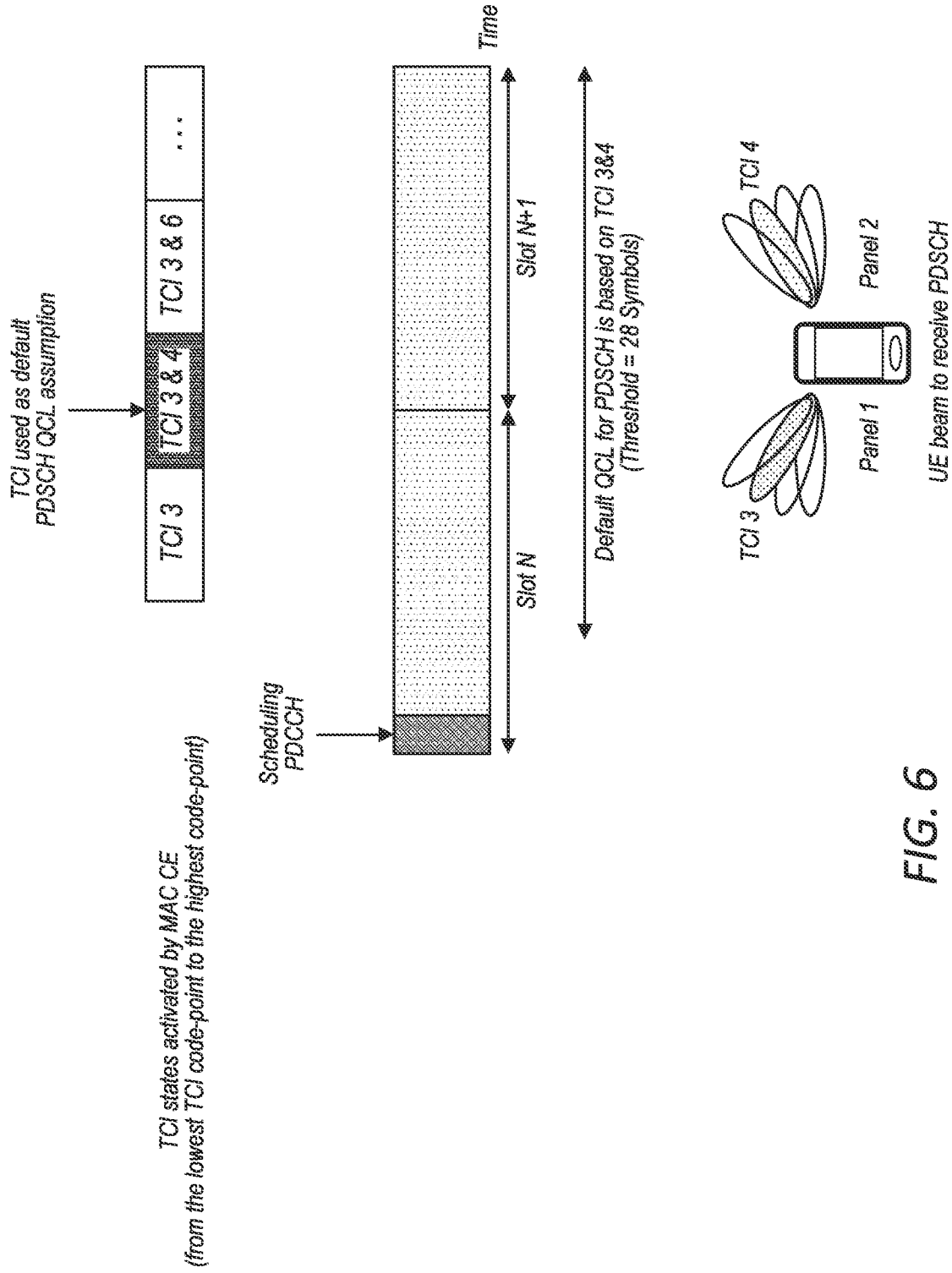
FIG. 6 illustrates aspects of an exemplary possible PDSCH QCL assumption determination process for a single-DCI mode, according to some embodiments.

FIG. 6 illustrates an example of a possible approach to determining the default PDSCH QCL assumption for single-DCI mode, according to some embodiments. The TCI codepoint may correspond to the TCI field indicated by DCI. As shown, in the example scenario, The TCI codepoint indicating TCI 3 & 4 may be the lowest TCI codepoint among the TCI codepoints containing two different TCI states that are activated, and thus may be used as the default PDSCH QCL assumption. Note that alternatively, e.g., if a UE does not support this feature, a UE could fallback to a previous release PDSCH QCL assumption, such as for 3GPP Release 15. At least according to some embodiments, this may include selecting the default PDSCH QCL based on the QCL assumption for the CORESET in the latest slot with lowest ID if multiple CORESETs are configured. If there is no CORESET configured, the default PDSCH QCL may be based on the activated TCI state with the lowest ID.

Figure 7:
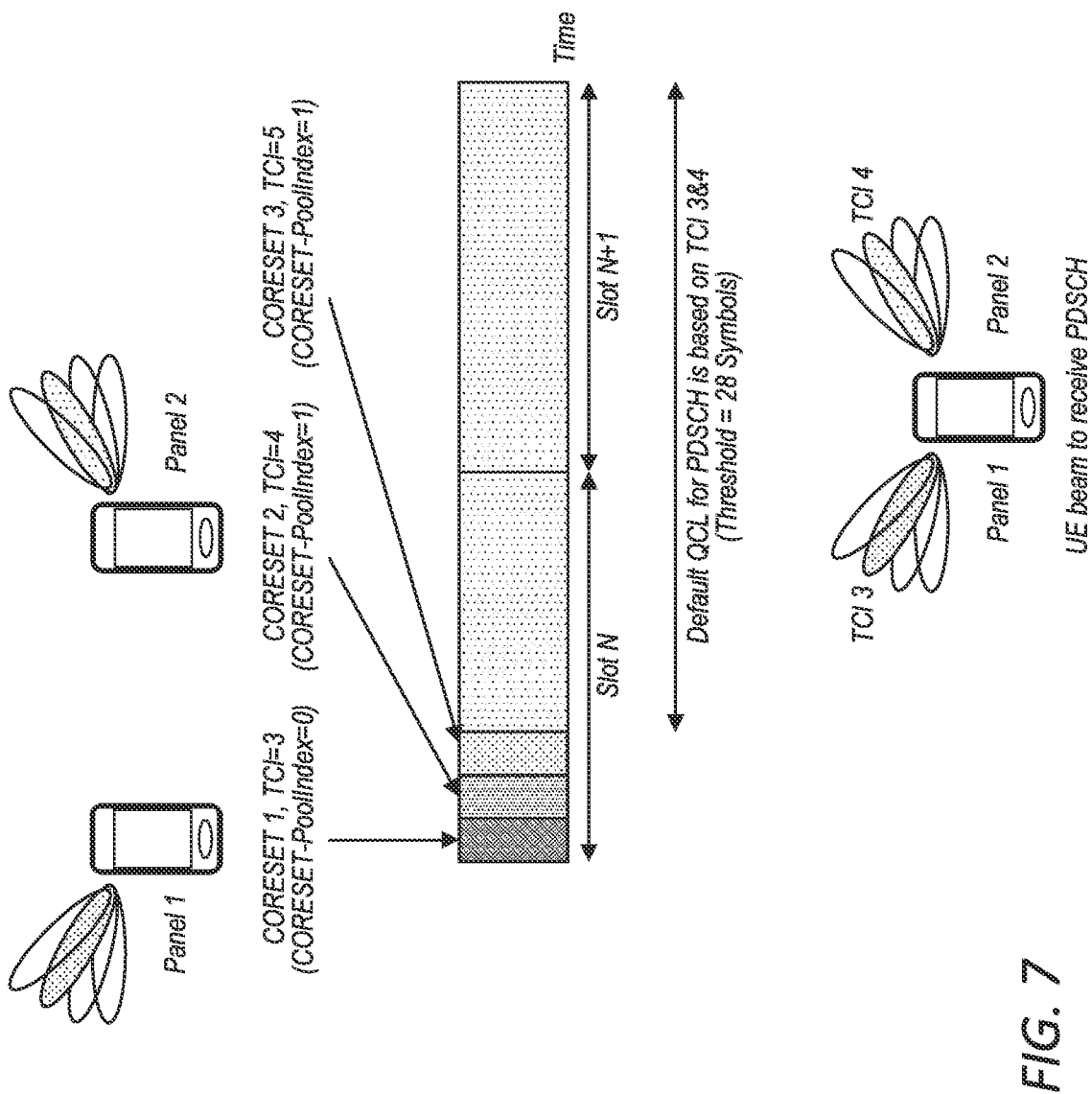
FIG. 7 illustrates aspects of an exemplary possible PDSCH QCL assumption determination process for a multi-DCI mode, according to some embodiments.

FIG. 7 illustrates an example of a possible approach to determining the default PDSCH QCL assumption for multi-DCI mode, according to some embodiments. According to the illustrated approach, the UE may search the latest monitored CORESETs for each CORESET pool, and if there are multiple CORESETs for a given CORESET pool in the latest slot, the one with the lowest CORESET ID may be selected. Thus, as shown, in the example scenario, TCI 3 & 4 may be used as the default PDSCH QCL assumption; TCI 3 may be selected as the monitored CORESET in the latest slot with the lowest ID among the CORESETS with CORESET-poolIndex=0, while TCI 4 may be selected as the monitored CORESET in the latest slot with the lowest ID among the CORESETS with CORESET-poolIndex=1. Note that alternatively, e.g., if a UE does not support this feature, a UE could fallback to a previous release PDSCH QCL assumption, such as for 3GPP Release 15. At least according to some embodiments, this may include selecting the default PDSCH QCL based on the QCL assumption for the CORESET in the latest slot with lowest ID if multiple CORESETs are configured. If there is no CORESET configured, the default PDSCH QCL may be based on the activated TCI state with the lowest ID.

Given the possibility for aperiodic CSI-RS to be scheduled by DCI using a scheduling offset below a threshold that would allow a UE to decode the DCI, it may also be useful to provide techniques for determining a default QCL assumption for aperiodic CSI-RS, at least according to some embodiments. For example, it may be useful to specify QCL assumptions for each of single DCI mode and multi-DCI mode, and for CSI-RS for beam management (e.g., CSI-RS resources in a resource set with a parameter repetition configured), CSI-RS for tracking (e.g., CSI-RS resources in a resource set with a parameter TRS-info configured), CSI-RS for CSI acquisition (e.g., CSI-RS resources in a resource set without a parameter repetition or TRS-info configured). Note that it may be the case that it is not allowed to configure both repetition and TRS-info in a CSI-RS resource set, at least according to some embodiments.

As one option for determining the aperiodic CSI-RS QCL assumption if the scheduling offset is below a certain threshold in single-DCI mode, the QCL for aperiodic CSI-RS may be based on the TCI states corresponding to the lowest codepoint among the TCI codepoints containing two different TCI states that are activated by a media access control (MAC) control element (CE). If there is no TCI codepoint mapped to more than 1 TCI state, or if a UE does not support this feature, the aperiodic CSI-RS CQL may be based on the QCL assumption for the monitored CORESET in the latest slot with the lowest ID if multiple CORESETs are configured.

Figure 8:
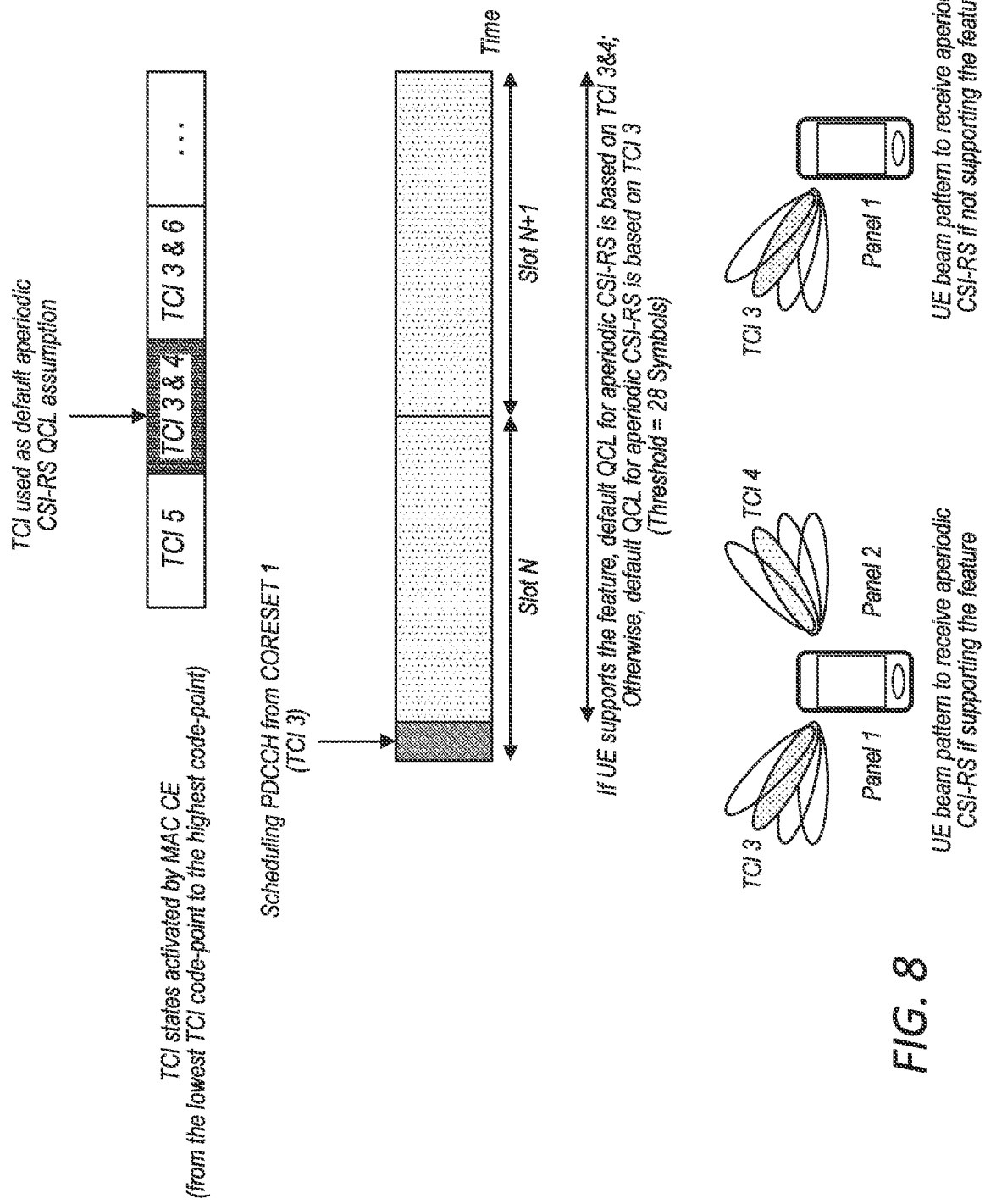
FIGS. 8-9 illustrate aspects of exemplary possible aperiodic CSI-RS QCL assumption determination processes for a single-DCI mode, according to some embodiments.

FIG. 8 illustrates an example of such a possible approach to determining the default aperiodic CSI-RS QCL assumption for single-DCI mode, according to some embodiments. As shown, in the example scenario, the TCI codepoint indicating TCI 3 & 4 may be the lowest TCI codepoint among the TCI codepoints containing two different TCI states that are activated, and thus may be used as the default aperiodic CSI-RS QCL assumption. In the scenario in which a UE does not support this feature, the UE may select TCI 3 as the default aperiodic CSI QCL assumption, e.g., based on the QCL assumption for the CORESET in the latest slot with lowest ID being TCI 3.

As another option for determining the aperiodic CSI-RS QCL assumption if the scheduling offset is below a certain threshold in single-DCI mode, the QCL for aperiodic CSI-RS may be based on one of the TCI states corresponding to the lowest codepoint among the TCI codepoints containing two different TCI states that are activated by a MAC CE. If there is no TCI codepoint mapped to more than 1 TCI state, or the UE does not support this feature, the default aperiodic CSI-RS QCL assumption may be based on the QCL assumption for the monitored CORESET in the latest slot with the lowest ID if multiple CORESETs are configured. The TCI state selection (selecting one of the two TCI states) could be based on one of the following options. As a first option, the UE always selects a TCI state based on the order of the TCI states (e.g., always selects the first TCI state, or always selects the second TCI state). As a second option, the UE always selects a TCI state based on the IDs of the TCI states (e.g., always selects the TCI state with the lowest ID, or always selects the TCI state with the highest ID). As a third option, the TCI index to be selected is configured by higher layer signaling from the cellular base station (e.g., gNB). As a fourth option, the TCI index to be selected is determiend by the CSI-RS resource index or CSI-RS resource set index. For example, the formula:

$$\text{TCI index} = \text{CSI-RS resource set index} \bmod 2$$

could be used to determine the TCI index to be selected, as one possibility.

Figure 9:
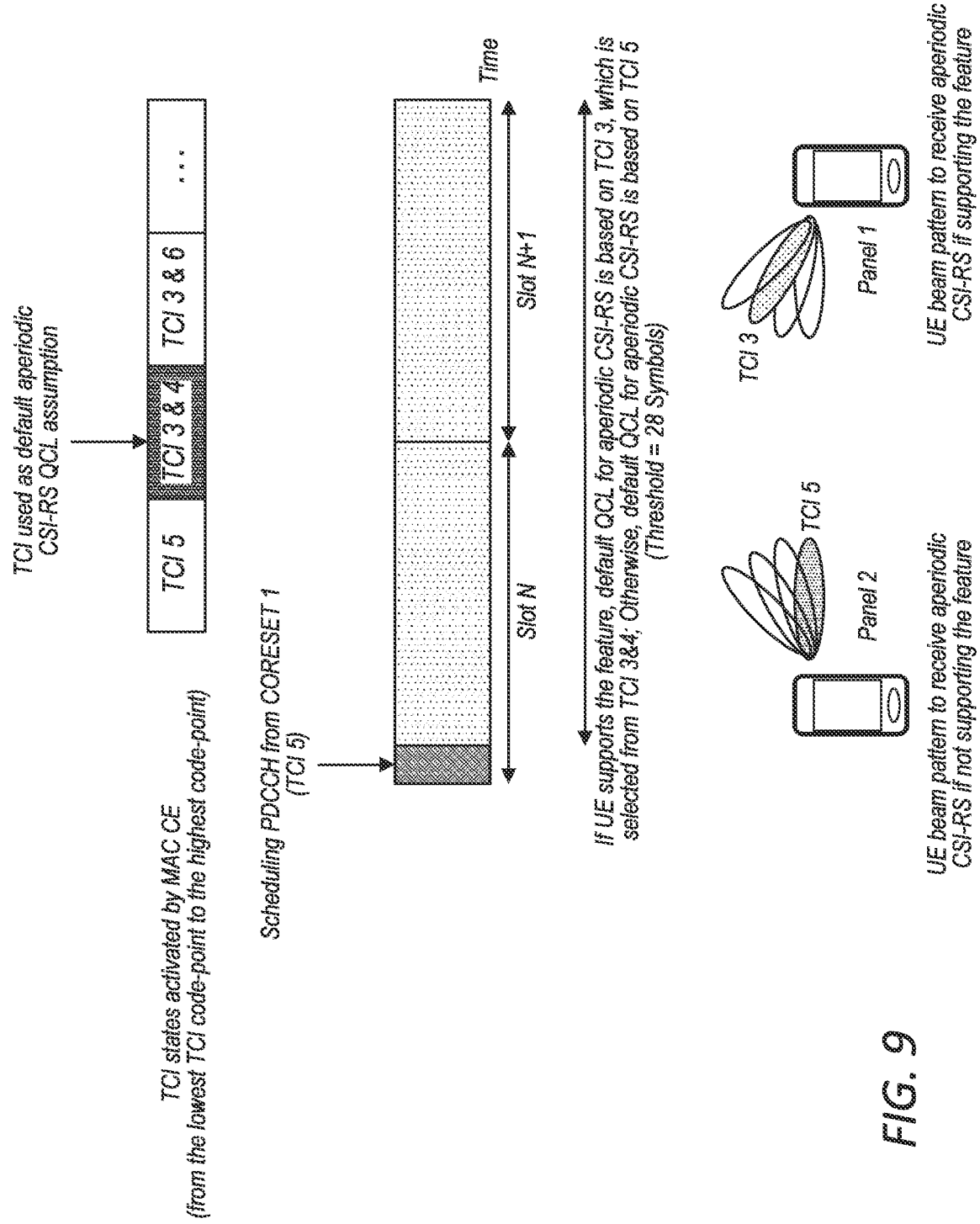

FIG. 9 illustrates an example of such a possible approach to determining the default aperiodic CSI-RS QCL assumption for single-DCI mode, according to some embodiments. As shown, in the example scenario, the TCI codepoint indicating TCI 3 & 4 may be the lowest TCI codepoint among the TCI codepoints containing two different TCI states that are activated, and from these TCI states, TCI 3 may be selected as the default aperiodic CSI-RS QCL assumption. In the scenario in which a UE does not support this feature, the UE may select TCI 5 as the default aperiodic CSI QCL assumption, e.g., based on the QCL assumption for the CORESET in the latest slot with lowest ID being TCI 5.

Note that as a still further possibility, it could be agreed that for single-DCI mode, the scheduling offset for aperiodic CSI-RS should always be no less than the reported scheduling offset threshold. Note additionally that the same or different options could be applied to different types of CSI-RS (e.g., CSI-RS for beam management, CSI-RS for tracking, and CSI-RS for CSI acquisition). If there is no TCI state activated by MAC CE, the default CQL for aperiodic CSI-RS and PDSCH could be based on one of the following options. As a first option, when the scheduling offset is below the scheduling offset threshold, the PDSCH/aperiodic CSI-RS CQL assumption is based on the QCL assumption for the CORESET in the latest slot with the lowest ID if multiple CORESETs are configured; if there is no CORESET configured, the default PDSCH/aperiodic CSI-RS CQL assumption may be based on the (e.g., RRC activated) TCI state with the lowest ID. As a second option, when the scheduling offset is below the scheduling offset threshold, he PDSCH/aperiodic CSI-RS CQL assumption is based on the synchronization signal block identified during initial access or the most recent random access procedure.

As one option for determining the aperiodic CSI-RS QCL assumption if the scheduling offset is below a certain threshold in multi-DCI mode, the QCL for aperiodic CSI-RS may be based on the QCL assumption for the monitored CORESET in the latest slot with the lowest ID among the CORESETs with the same CORESET-poolIndex. If a UE does not support this feature, the default aperiodic CSI-RS CQL may be based on the QCL assumption for the monitored CORESET in the latest slot with the lowest ID if multiple CORESETs are configured.

Figure 10:
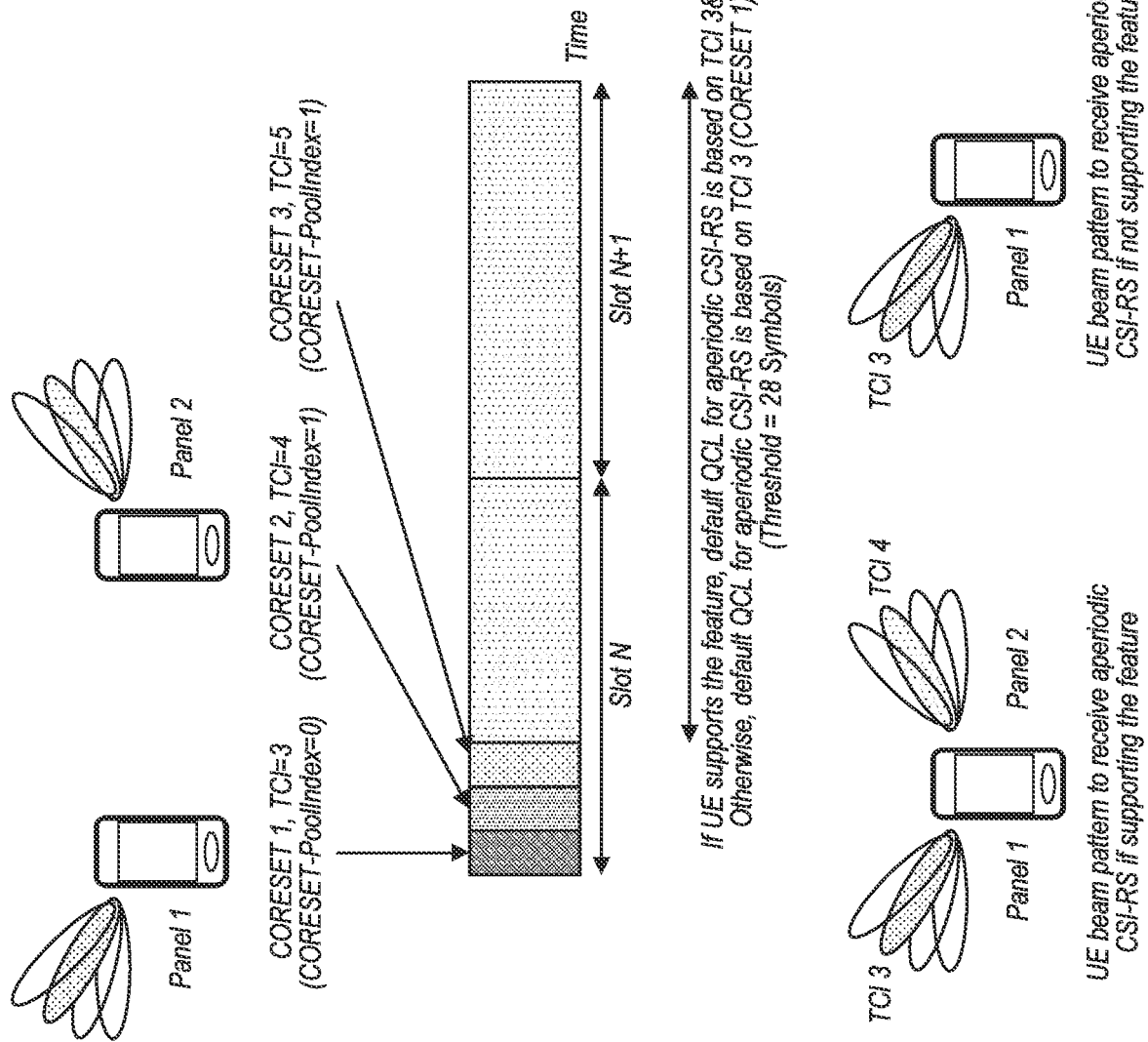
FIGS. 10-11 illustrate aspects of exemplary possible aperiodic CSI-RS QCL assumption determination processes for a multi-DCI mode, according to some embodiments.

FIG. 10 illustrates an example of such a possible approach to determining the default aperiodic CSI-RS QCL assumption for multi-DCI mode, according to some embodiments. As shown, in the example scenario, TCI 3 may be the QCL for the only CORESET (CORESET 1) with CORESET-poolIndex=0, and TCI 4 may be the QCL for the CORESET with the lowest ID (CORESET 2) among the CORESETs with CORESET-poolIndex=1, and so TCI 3 & 4 may be used as the default aperiodic CSI-RS QCL assumption. In the scenario in which a UE does not support this feature, the UE may select TCI 3 as the default aperiodic CSI QCL assumption, e.g., based on the QCL assumption for the CORESET in the latest slot with lowest ID being TCI 3.

As another option for determining the aperiodic CSI-RS QCL assumption if the scheduling offset is below a certain threshold in multi-DCI mode, the QCL for aperiodic CSI-RS may be based on the QCL assumption for the monitored CORESET in the latest slot with the lowest ID among the CORESETs with the same CORESET-poolIndex as the CORESET carrying the scheduling PDCCH. If a UE does not support this feature, the default aperiodic CSI-RS CQL may be based on the QCL assumption for the monitored CORESET in the latest slot with the lowest ID if multiple CORESETs are configured.

Figure 11:
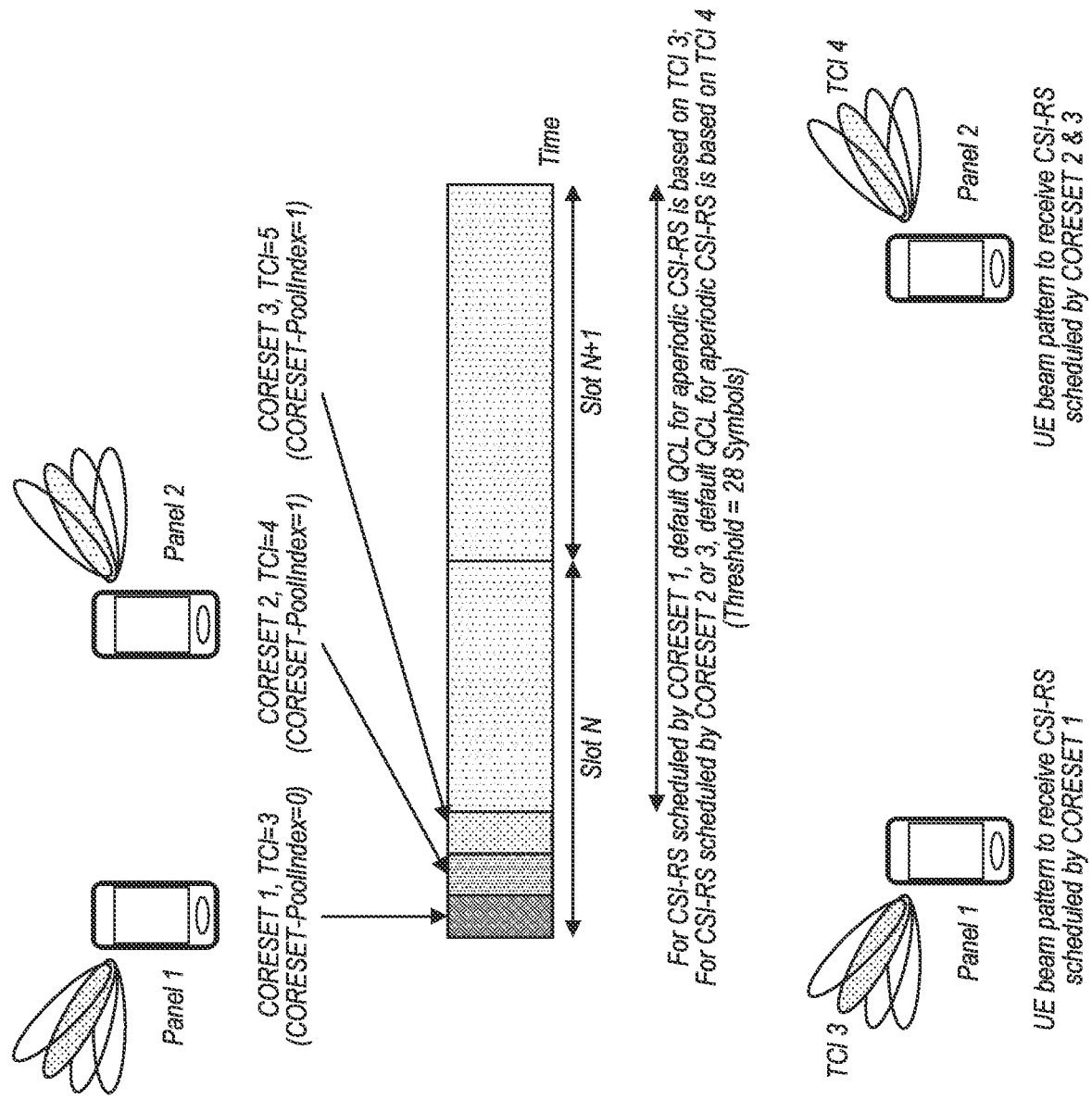

FIG. 11 illustrates an example of such a possible approach to determining the default aperiodic CSI-RS QCL assumption for multi-DCI mode, according to some embodiments. As shown, in the example scenario, for CSI-RS scheduled by CORESET 1, the default QCL for aperiodic CSI-RS may be based on TCI 3, e.g., as TCI 3 is the QCL for CORESET 1, and CORESET 1 is the only monitored CORESET in the latest slot with CORESET-poolIndex=0. Similarly, for CSI-RS scheduled by CORESET 2 or 3, the default QCL for aperiodic CSI-RS may be based on TCI 4, e.g., as TCI 4 is the QCL for CORESET 2, which may be the CORESET with the lowest ID among the CORESETs with CORESET-poolIndex=1.

Note that as a still further possibility, it could be agreed that for multi-DCI mode, the scheduling offset for aperiodic CSI-RS should always be no less than the reported scheduling offset threshold. Note additionally that the same or different options could be applied to different types of CSI-RS (e.g., CSI-RS for beam management, CSI-RS for tracking, and CSI-RS for CSI acquisition). According to some embodiments, if there is no CORESET configured, the default QCL may follow the QCL of the TCI state with the lowest ID activated by MAC CE. According to some embodiments, if there is no active TCI state, the default QCL may follow a SSB in the same component carrier (CC) or in the CC with lowest ID in the same band or band group.

In the following further exemplary embodiments are provided.

One set of embodiments may include an apparatus, comprising: a processor configured to cause a wireless device to: receive downlink control information (DCI); determine a quasi-co-located (QCL) assumption for aperiodic channel state information reference signals (CSI-RS) for the downlink control information; and buffer received signals according to the QCL assumption for aperiodic CSI-RS if a scheduling offset for the DCI is below a scheduling offset threshold.

According to some embodiments, the DCI is received in a single DCI mode, wherein to determine the QCL assumption, the processor is further configured to cause the wireless device to: select transmission configuration indicators (TCIs) corresponding to a lowest TCI codepoint among activated TCI codepoints that include two different TCI states.

According to some embodiments, if there is no TCI codepoint that includes more than 1 TCI state, the determined QCL assumption for aperiodic CSI-RS is based on a QCL assumption for a monitored control resource set in a latest slot with a lowest identifier.

According to some embodiments, the DCI is received in a single DCI mode, wherein to determine the QCL assumption, the processor is further configured to cause the wireless device to: select a transmission configuration indicator (TCI) that is included in a lowest TCI codepoint among activated TCI codepoints that include two different TCI states.

According to some embodiments, the TCI is further selected based at least in part on one or more of: an order of the two different TCI states included in the lowest TCI codepoint among activated TCI codepoints that include two different TCI states; a TCI state identifier of the TCI; configuration information received from a cellular base station; or a CSI-RS resource index or CSI-RS resource set index of the aperiodic CSI-RS.

According to some embodiments, the determined QCL assumption for aperiodic CSI-RS includes a transmission configuration indicator (TCI) state activated by media access control (MAC) control element (CE) if at least one TCI is activated by MAC CE, wherein if there is no TCI state activated by media access control (MAC) control element (CE), the processor is further configured to cause the wireless device to: determine the QCL assumption for aperiodic CSI-RS based on a QCL assumption for a control resource set in a latest slot with a lowest identifier; and determine the QCL assumption for aperiodic CSI-RS based on a TCI state activated by radio resource control (RRC) signaling with a lowest identifier if there are no control resource sets configured.

According to some embodiments, the determined QCL assumption for aperiodic CSI-RS includes a transmission configuration indicator (TCI) state activated by media access control (MAC) control element (CE) if at least one TCI is activated by MAC CE, wherein if there is no TCI state activated by media access control (MAC) control element (CE), the processor is further configured to cause the wireless device to: determine the QCL assumption for aperiodic CSI-RS based on a synchronization signal block (SSB) identified during initial access or a most recent random access procedure.

Another set of embodiments may include a wireless device, comprising: an antenna; a radio operably coupled to the antenna; and a processor operably coupled to the radio; wherein the wireless device is configured to: receive downlink control information (DCI); determine a quasi-co-located (QCL) assumption for aperiodic channel state information reference signals (CSI-RS) for the downlink control information; and buffer received signals according to the QCL assumption for aperiodic CSI-RS if a scheduling offset for the DCI is below a scheduling offset threshold.

According to some embodiments, the DCI is received in a multi DCI mode, wherein the wireless device is further configured to, for each respective control resource set (CORESET) pool of a plurality of CORESET pools: determine the QCL assumption for aperiodic CSI-RS based on a QCL assumption for a CORESET in a latest slot with a lowest identifier among CORESETs in the respective CORESET pool.

According to some embodiments, the DCI is received in a multi DCI mode, wherein the wireless device is further configured to: determine the QCL assumption for aperiodic CSI-RS for a respective control resource set (CORESET) based on a QCL assumption for a CORESET in a latest slot with a lowest identifier among CORESETs in a same CORESET pool as the respective CORESET.

According to some embodiments, the DCI is received in a multi DCI mode, wherein if there is no control resource set (CORESET) configured, to determine the QCL assumption, the processor is further configured to cause the wireless device to: select a transmission configuration indicator (TCI) state activated by media access control (MAC) control element (CE) with a lowest identifier.

According to some embodiments, if there is no TCI state activated by MAC CE, the wireless device is further configured to: determine the QCL assumption for aperiodic CSI-RS based on a synchronization signal block (SSB) in a same component carrier or in a component carrier with a lowest identifier in a same band or band group.

According to some embodiments, the wireless device is further configured to: determine the QCL assumption for aperiodic CSI-RS further based at least in part on a type of CSI-RS for which the QCL assumption is determined.

Yet another set of embodiments may include a method, comprising: by a wireless device: establishing wireless links with multiple transmission-reception-points (TRPs) of a cellular network according to a multi-TRP configuration; receiving downlink control information (DCI); determining a quasi-co-located (QCL) assumption for aperiodic channel state information reference signals (CSI-RS) for the downlink control information; and buffering received signals according to the QCL assumption for aperiodic CSI-RS if a scheduling offset for the DCI is below a scheduling offset threshold.

According to some embodiments, the DCI is received in a single DCI mode, wherein determining the QCL assumption further comprises: selecting transmission configuration indicators (TCIs) corresponding to a lowest TCI codepoint among activated TCI codepoints that include two different TCI states.

According to some embodiments, the DCI is received in a single DCI mode, wherein determining the QCL assumption further comprises: selecting one of two transmission configuration indicators (TCIs) that are included in a lowest TCI codepoint among activated TCI codepoints that include two different TCI states.

According to some embodiments, the DCI is received in a multi DCI mode, wherein the method further comprises, for each respective control resource set (CORESET) pool of a plurality of CORESET pools: determining the QCL assumption for aperiodic CSI-RS based on a QCL assumption for a CORESET in a latest slot with a lowest identifier among CORESETs in the respective CORESET pool.

According to some embodiments, the DCI is received in a multi DCI mode, wherein the wireless device is further configured to: determine the QCL assumption for aperiodic CSI-RS for a given control resource set (CORESET) based on a QCL assumption for a CORESET in a latest slot with a lowest identifier among CORESETs in a same CORESET pool as the CORESET.

According to some embodiments, the DCI is received in a multi DCI mode, wherein the method further comprises: determining the QCL assumption for aperiodic CSI-RS for each respective control resource set (CORESET) based on a QCL assumption for a CORESET in a latest slot with a lowest identifier among CORESETs in a same CORESET pool as the respective CORESET.

According to some embodiments, the method further comprises: determining the QCL assumption for aperiodic CSI-RS further based at least in part on whether the aperiodic CSI-RS include: CSI-RS for beam management; CSI-RS for tracking; or CSI-RS for CSI acquisition. According to some embodiments, the method further comprises: providing capability information for the wireless device to a cellular base station, wherein the capability information indicates an aperiodic CSI-RS QCL assumption determination approach supported by the wireless device.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
 receive downlink control information (DCI);
 determine a first quasi-co-located (QCL) assumption for aperiodic channel state information reference signals (CSI-RS) for the DCI;
 buffer received signals according to the first QCL assumption for aperiodic CSI-RS if a scheduling offset for the DCI is below a scheduling offset threshold,
 wherein the first QCL assumption for aperiodic CSI-RS includes a transmission configuration indicator (TCI) state activated by media access control (MAC) control element (CE) if at least one TCI is activated by MAC CE,
 determine that there is no TCI state activated by MAC CE for the aperiodic CSI-RS and other resources; and
 in response to the determination that there is no TCI state activated by MAC CE for the aperiodic CSI-RS and other resources, determine the first QCL assumption for aperiodic CSI-RS based on a QCL assumption for a control resource set in a latest slot with a lowest identifier.

2. The apparatus of claim 1,
wherein the processor is further configured to cause the wireless device to:
determine the first QCL assumption for aperiodic CSI-RS based on a TCI state activated by radio resource control (RRC) signaling with a lowest identifier if there are no control resource sets configured.

3. The apparatus of claim 1,
wherein the processor is further configured to cause the wireless device to:
determine the first QCL assumption for aperiodic CSI-RS based on a synchronization signal block (SSB) identified during initial access or a most recent random access procedure.

4. A wireless device, comprising:
an antenna;
a radio operably coupled to the antenna; and
a processor operably coupled to the radio;
wherein the processor is configured to cause the wireless device to:
 receive downlink control information (DCI);
 determine a first quasi-co-located (QCL) assumption for aperiodic channel state information reference signals (CSI-RS) for the DCI; and
 buffer received signals according to the first QCL assumption for aperiodic CSI-RS if a scheduling offset for the DCI is below a scheduling offset threshold,
 wherein the first QCL assumption for aperiodic CSI-RS includes a transmission configuration indicator (TCI) state activated by media access control (MAC) control element (CE) if at least one TCI is activated by MAC CE,
 determine that there is no TCI state activated by MAC CE for the aperiodic CSI-RS and other resources; and
 in response to the determination that there is no TCI state activated by MAC CE for the aperiodic CSI-RS and other resources, determine the first QCL assumption for aperiodic CSI-RS based on a QCL assumption for a control resource set in a latest slot with a lowest identifier.

5. The wireless device of claim 4, wherein the processor is further configured to cause the wireless device to, for each respective control resource set (CORESET) pool of a plurality of CORESET pools:
determine the first QCL assumption for aperiodic CSI-RS based on a QCL assumption for a CORESET in a latest slot with a lowest identifier among CORESETs in the respective CORESET pool.

6. The wireless device of claim 4, wherein the processor is further configured to cause the wireless device to, determine the first QCL assumption for aperiodic CSI-RS based on a QCL assumption for a monitored control resource set (CORESET) in a latest slot with a lowest identifier among CORESETs in a same CORESET pool as a CORESET carrying a scheduling physical downlink control channel (PDCCH).

7. The wireless device of claim 4, wherein the processor is further configured to cause the wireless device to:
determine the first QCL assumption for aperiodic CSI-RS further based at least in part on a type of CSI-RS for which the first QCL assumption is determined.

8. A method, comprising:
establishing wireless links with multiple transmission-reception-points (TRPs) of a cellular network according to a multi-TRP configuration;
receiving downlink control information (DCI);
determining a first quasi-co-located (QCL) assumption for aperiodic channel state information reference signals (CSI-RS) for the DCI; and
buffering received signals according to the first QCL assumption for aperiodic CSI-RS if a scheduling offset for the DCI is below a scheduling offset threshold,
wherein the first QCL assumption for aperiodic CSI-RS includes a transmission configuration indicator (TCI) state activated by media access control (MAC) control element (CE) if at least one TCI is activated by MAC CE,
determine that there is no TCI state activated by MAC CE for the aperiodic CSI-RS and other resources; and
in response to the determination that there is no TCI state activated by MAC CE for the aperiodic CSI-RS and other resources, determining the first QCL assumption for aperiodic CSI-RS based on a QCL assumption for a control resource set in a latest slot with a lowest identifier.

9. The method of claim 8, further comprising:
receiving second DCI; and
determining a second QCL assumption for aperiodic CSI-RS for the second DCI, wherein:
if a scheduling offset for the second DCI is not below the scheduling offset threshold, the second QCL assumption is based on a QCL indication included in the second DCI; or
if the scheduling offset for the second DCI is below the scheduling offset threshold, the second QCL assumption is not determined based on the second DCI.

10. The method of claim 8, wherein the method further comprises, for each respective control resource set (CORESET) pool of a plurality of CORESET pools:
determining the first QCL assumption for aperiodic CSI-RS based on a QCL assumption for a CORESET in a latest slot with a lowest identifier among CORESETs in the respective CORESET pool.

11. The method of claim 8, wherein the method further comprises:
determining the first QCL assumption for aperiodic CSI-RS for a respective control resource set (CORESET) based on a QCL assumption for a CORESET in a latest slot with a lowest identifier among CORESETs in a same CORESET pool as the respective CORESET.

12. The method of claim 8, wherein the method further comprises:
determining the first QCL assumption for aperiodic CSI-RS further based at least in part on whether the aperiodic CSI-RS include:
CSI-RS for beam management;
CSI-RS for tracking; or
CSI-RS for CSI acquisition.

13. The method of claim 8, wherein the method further comprises:
providing capability information for a wireless device to a cellular base station, wherein the capability information indicates an aperiodic CSI-RS QCL assumption determination approach supported by the wireless device.

* * * * *